UNITED STATES PATENT OFFICE.

LORENZO FAGERSTEN, OF CHICAGO, ILLINOIS.

IMPROVEMENT IN PROCESSES FOR PREVENTING MOLD UPON MEATS.

Specification forming part of Letters Patent No. 221,541, dated November 11, 1879; application filed July 30, 1879.

*To all whom it may concern:*

Be it known that I, LORENZO FAGERSTEN, of Chicago, in the county of Cook and State of Illinois, have invented a new and useful Process of Preventing Mold upon Meats; and I hereby declare the following to be a full, clear, and exact description thereof, which will enable others skilled in the art to which my invention appertains to use the same.

My invention relates to a process of preventing mold upon cured meats, more especially hams and shoulders; and it consists in immersing or dipping the meats in a hot solution of boracic acid or its salts, as hereinafter described and claimed.

It is well known that in the process of preparing smoked meats they are first pickled or dry-salted and cured prior to being smoked, and that all pickled meats after being cured are drained of the pickle, and so permitted to remain for some time before being smoked, in order to attain the desired mellowness, and that during this time the meats are exposed to contact with the germs contained in the atmosphere.

The germs contained in the atmosphere, when in contact with the pickled and cured meats, generate a luxuriant and baneful growth of fungi, which, if not checked in time, causes a decomposition of the meats. The usual practice is to wash off this fungus, mold, or slime from meats, such as shoulders, hams, &c., before being smoked, with hot water, which, however, does not produce the desired result, from the fact that the germs, fungi, mold, or slime cannot be killed in any heat attainable by water in open vessels.

The object of my invention is to kill and remove from meats the said germs, fungi, mold, or slime.

After the meats have been pickled and cured I immerse or dip them in a hot solution of boracic acid or its salts, as borax, boracite, and borocalcite, (whether or not the meats have previously been washed in water or pickle,) and prior to placing the meats in the drying-room or smoke-house.

Boracic acid and its salts are only slightly soluble in cold water, and their solubility increases rapidly with the increase of temperature of the water, and when the solution is of about boiling-heat it will not only kill all germs, fungi, mold, or slime that may have attached themselves to the meats, but adheres to the surface of the meats in the process of evaporation therefrom when placed in the drying-room or smoke-house, and so as to form a coating of crystallized boracic acid thereon, which, while perfectly innocuous, tends to prevent any further contamination from germs in the air, but does not prevent the drying or smoking of the meats in the usual manner.

In practice I prefer to use a solution of boracic acid at boiling-heat; but the solution may be used with success if slightly varying therefrom, so long as it is hot.

I do not claim, broadly, the use of boracic acid or its salts, as I am aware they have been used in a powdered condition and in a cold solution, but am not aware that a hot solution of boracic acid or its salts has been heretofore used for the purpose of preventing mold upon meats.

Having thus described my invention, what I claim as new, and desire to secure by Letters Patent, is—

The process of preparing and preserving meats, which consists in first curing the meats in the ordinary manner by pickling, then dipping or immersing the same in a hot solution of boracic acid or its salts, and finally smoking the same.

LORENZO FAGERSTEN.

Witnesses:
WM. ZIMMERMAN,
JAMES HOWE.